Patented Nov. 8, 1938

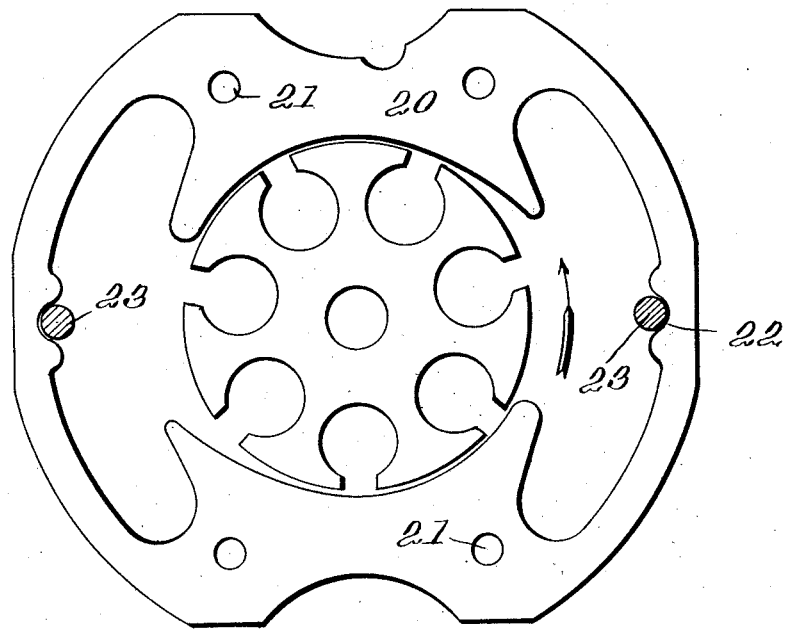
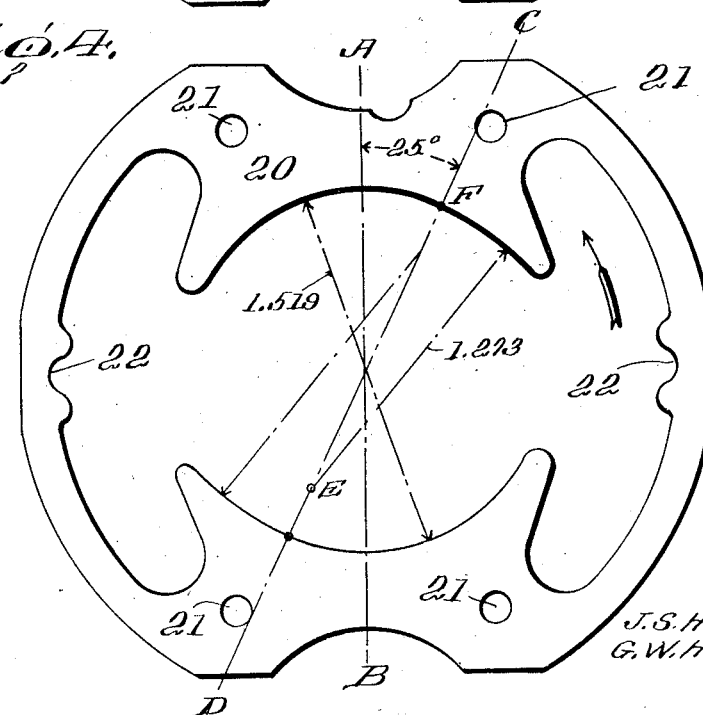

2,136,301

UNITED STATES PATENT OFFICE 2,136,301

DYNAMO-ELECTRIC MACHINE

Joseph S. Hoddy and George W. Hoddy, Flint, Mich., assignors to A. G. Redmond Co., Flint, Mich., a corporation of Michigan Application August 10, 1937, Serial No. 158,422

16 Claims. (Cl. 172—36)

This invention relates to improvements in dynamo electric machines.

An object of the invention is to provide a motor in the operation of which the usual noise produced by shaft rattle or shaft vibration is removed or materially reduced. The type of motor with which the invention is immediately concerned is of the direct current six-volt fractional horse-power type commonly used to operate the fans of heaters for automobiles, although the principles involved have a wider application, including larger motors and are also applicable to alternating current machines as well.

One of the principal objections in the operation of small motors of the character under consideration is the noise due to shaft vibration or bearing rattle, which becomes more troublesome as the power of the motor is increased, and this objection is of substantial importance due to the fact that the manufacturers of automobile heaters require more power to be developed by the fan motor and at the same time demand a more quiet operation. At the same time the space limitations relative to the size of a motor must be observed.

Another matter which must be taken into consideration is the cost of manufacture of these small motors, and as a consequence practically all machining operations must be eliminated. This requires that the field and armature laminations shall be punched from stock in such dimensions that the laminations may be assembled and built into the machine without any machining operation.

Another matter of importance is the support of the armature in suitable bearings which themselves must be inexpensive to manufacture and which admit of quick and easy assembly on the armature shaft and which are simply supported in the motor casing.

In a motor of this character the matter of the shaft making a noise due to rattle in its bearings is not only dependent on the balance of the shaft or the device mounted on the shaft, but also to electrical impulses which add to the motion of the shaft. In an armature having only seven slots and seven commutator segments it is apparent that the magnetic impulses occasioned when the armature coils come under control of the brushes are relatively widely spaced in time as compared to a machine having a substantially larger number of slots. The motor might be made to run more smoothly by increasing substantially the number of armature slots, but since it is necessary to make the motors as powerful as possible and considering the space limitations, it is practically necessary to use a seven-slot armature for the purpose these motors are designed to fulfill.

It may be possible to get a comparatively smooth running motor of this general type by using tight fitting bearings. On the other hand such bearings would be expensive to manufacture and their use would not be justified for that reason. The most satisfactory type of bearing for the type of motor under discussion appears to be a sleeve bearing of porous material which is self-lubricating but which, however, has the objections that it cannot be made to fit tight enough to the shaft to prevent wear without unduly loading the shaft due to friction of the bearing. This type of bearing also is comparatively soft and if the shaft is permitted any substantial latitude of vibration, it becomes worn and enlarged, adding to the difficulty sought to be overcome.

Applicants have substantially overcome bearing rattle by a specific design in the shape of the field laminations of the pole faces of the motor field. This is accomplished by opening the air gap at the leading pole tips of the field structure. This opening of the air gap is not to be confused with the known procedure of chamfering the pole tips of electric machines for the purpose of helping commutation and reducing the arcing at the brushes. This modification of the pole faces with the field structure reduces and substantially removes the noise due to bearing rattle caused by unbalanced magnetic circuits between the armature and field and makes the motor more practical for noiseless operation and improves the life of the bearings, brushes and commutator.

It is also an object of the invention to improve the performance of the motor by shifting the brushes in the direction of rotation to correct for the shift in field flux due to the pole chamfer referred to and still further to improve the performance by removing the projections normally employed around the case bolt holes in the field yoke so as to permit larger field coils to be inserted than would be otherwise possible.

In the drawings—

Figure 3 is a view in elevation of a field lamination and an armature lamination in their correct relative position with respect to each other when assembled in a machine, and Figure 4 is a view in elevation of a field lamination.

Figure 1:
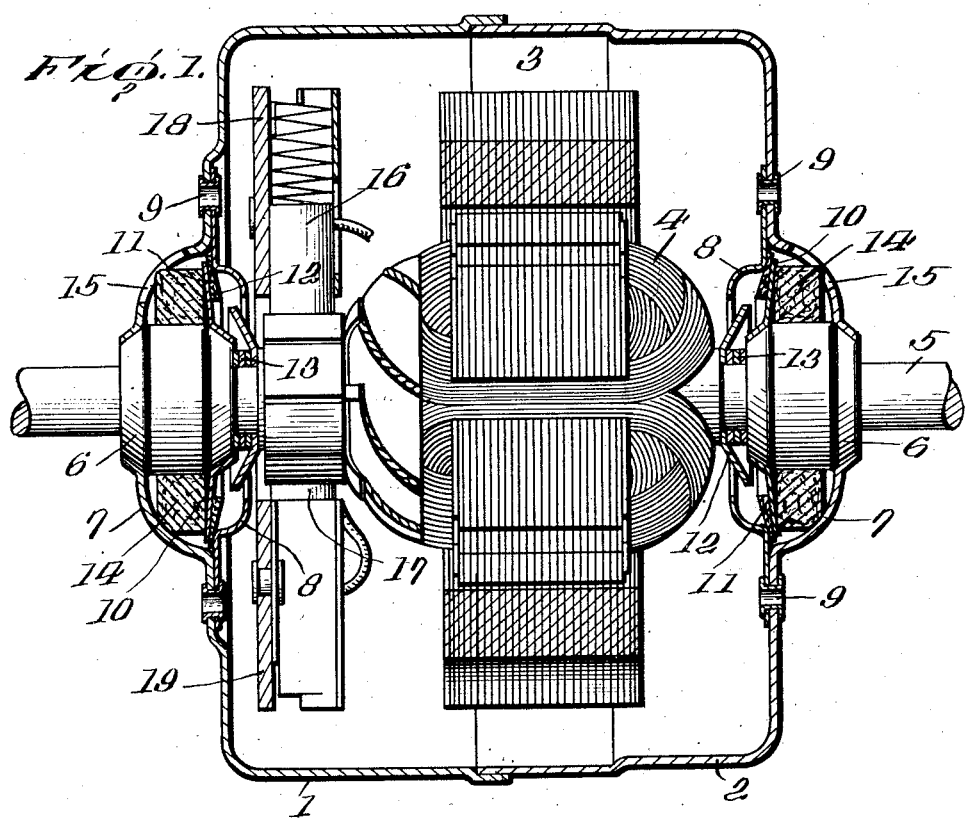
Figure 1 shows an elevation of a motor of the type under consideration, with part of the casing removed and showing the relationship between the bearings, armature, field construction, and brushes.

In Figure 1 of the drawings, the motor casing is made in two parts, 1 and 2, which for convenience are shown as slightly overlapping at the center in telescopic relation.

The laminated field structure 3 is mounted in the casing 2, and the armature 4 is mounted on shaft 5 which is supported in bearings 6 mounted centrally in the end walls of the case sections 1 and 2. The central portion of the end wall of each casing section is expanded into a bell-shaped construction as indicated at 7 to form an outer supporting wall for the bearing 6. A corresponding inwardly expanded member 8 is attached to the end wall as by means of rivets 9. The inner end of the bearing member 6 is supported on a cone-shaped flange formed centrally of a ring 10. This ring is spaced from the member 8 by a resilient or felt washer 11. Mounted on shaft 5 between the bearing and the armature structure is a cone-shaped washer 12 which extends within the opening in the member 8 and is spaced from the bearing member 6 by a series of washers 13. Ring 12, when in rotation catches any oil that may seep along the shaft toward the armature and throws it outwardly into the bell-shaped member 8 in which it gradually works its way to the lower part of this member and is collected by the member 8 and the end wall 7. 14 is a felt ring or washer which serves to hold a lubricant and gradually feed it to the porous bearing member 6. Lubricant may be applied to the washer or ring 14 through an opening 15 in the end wall 7. Brushes 16 and 17 are shown at the left in Figure 1 and are carried by brush holders 18 and 19 by which the brushes may be adjusted in the usual manner.

The field laminations 20 are clamped in engagement by means of suitable bolts or rivets passing through openings 21 therein.

Figure 2:
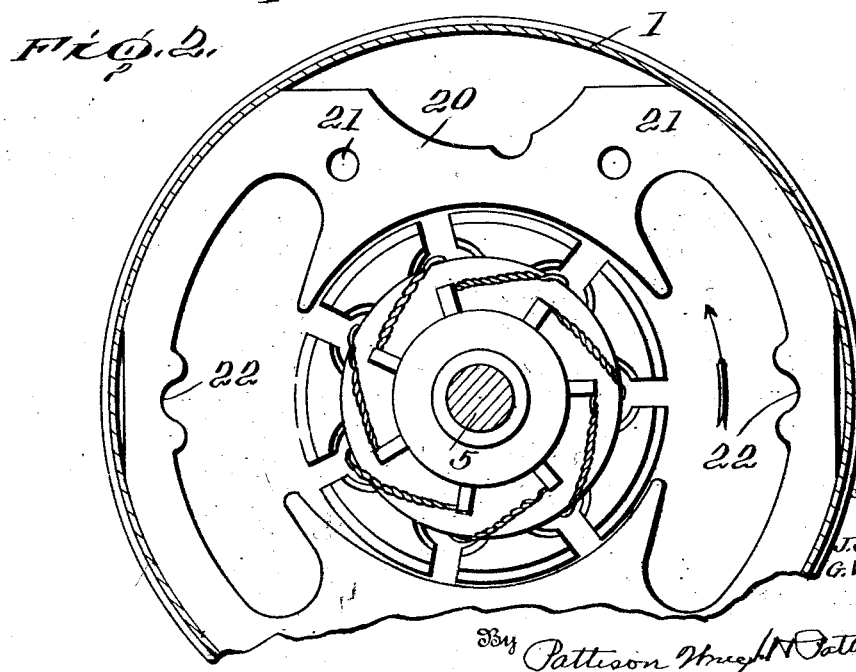
Figure 2 is a view from the left of the armature and field structure shown in Fig. 1.

In Figures 2 and 3 the depression shown at 22 on each side of the field yoke is for engagement with the sides of bolts 23 which fasten the two parts of the casing together. Bolt holes are usually provided at this point in small motors of this type for the same purpose and are entirely enclosed. As indicated above it is difficult to get a field coil of sufficiently large size in proper position within the field structure with previous constructions in which the casing bolt holes were completely enclosed on the inside of the structure due to the inner projection of the laminated structure on the inside of the yoke. Applicants have overcome this difficulty by cutting away the projecting structure inwardly of the bolt hole, thereby giving more space within the field yoke in which to insert the field coil.

In actual practice the preformed field coils are inserted in the field yoke and secured in position by the method disclosed in United States Patent No. 2,038,446, granted to Albert G. Redmond, covering an Electric motor.

Figure 3 of the drawings shows the relative rotation of a field and armature lamination when in correct operative position. In the example illustrated the armature lamination is substantially 1.5 inches in diameter and the air gap is .015 inch.

Figure 4 shows a field lamination and the manner in which the proper chamfer of the lamination at the leading pole tips is accomplished. From the vertical center line A—B, an angle of substantially 25° is laid off in the direction of the leading pole tips as indicated by the line C—D. The next step is to select a point E on the line C—D with a radius of substantially 1.273 inches and with this line as a radius draw an arc from the point F to the end of the leading pole tip. This arc is tangent to the internal diameter circle of the lamination at F, and when produced to the end of the pole tip opens the air gap from .015 inch to substantially .078 inch at the leading pole tip. In this example the ratio of the diameter of the field bore to the radius defining the arc is substantially six to five.

The magnetic circuits of D. C. motors consist of the field m. m. f. and the armature m. m. f. These m. m. f.'s add together at the leading pole tips and subtract at the trailing pole tips. The resultant m. m. f. at the leading pole tips causes a high concentration of magnetic flux at the leading pole tips and a decrease at the trailing pole tips. This concentration of the magnetic flux at the leading pole tips when the armature turns approaching these tips become energized, gives the armature a jerky movement particularly when as in very small motors a small number of armature slots is permissible.

In order to reduce the concentration of flux at the leading pole tips, these tips are chamfered in the manner indicated above and the chamber is such that the air gap at the pole tips is increased in the example illustrated from .015 inch to .078 inch.

In the bipolar motor illustrated there are seven slots in the armature and one coil per slot. The brushes used are not quite as wide as one commutator bar and since an uneven number of slots are used at least one coil is short circuited at the brushes at all times. The current in each coil is reversed twice for each revolution of the armature which means there are fourteen reversals of current for each revolution of the armature. At the instant each coil is energized there is produced a strong magnetic attraction of the armature to the leading pole tip nearest the coil. It can be easily seen that for a given air-gap the magnetic pull above described will be most uniform when the armature is located in the exact center of the field bore. However, it is not practical for such to be the case and especially where the motor is made entirely of metal stampings as in the case of the motor described.

This motor consists of two cases enclosing a field and with a self-aligning type bearing of porous material secured in each case to permit the armature to revolve in the field. Even with the most accurate dies possible for practical use the armature may be from .008 to .015 eccentric with respect to the field bore which means that the armature may be .004" to .008" closer to one field pole tip than the corresponding pole tip on the opposite pole. The air gap used is .015" which means the armature under the above condition would be .007 from one pole tip and .023" from the opposite pole tip. The magnetic attraction varies inversely as the distance so that there will be more than three times the pull on the armature on one side than on the other. If it were practically possible to fit bearings on the armature shaft with zero clearance there would be no rattle produced by the above magnetic pull since there would be no slack to take up between bearing and shaft but for obvious reasons this is not possible. Slight changes in temperature, changes in the lubricant, or small particles of dirt getting into the bearing would cause the bearing to tighten on the shaft and failure result. Regardless of the type of bearing used a small clearance must be maintained to insure the running of the motor. This condition exists in all the motors of this type known to the art, and it will now be shown how this difficulty has been overcome by correctly designing the field laminations with the correct chamfer of the leading pole tips, and no chamfer of the trailing pole tips.

Increasing the air gap at the leading pole tips from five to seven times the normal air gap of .015" and chamfering back on an arm which is tangent to the field bore at from 28% to 35% of the pole enclosure from the leading pole tip, has been found to be the most effective chamfer for removing the bearing rattle. This chamfer produces a tapering off of the magnetic pull at the leading pole tips and there is a much smaller variation in air-gap between corresponding pole tips when the armature eccentricity is a maximum so that the armature impulses are smoothed out and the proper bearing clearance may be used without the risk of bearing rattle. It is obvious that smoothing out the armature impulses improves the life of the motor by increasing bearing life, commutator and brush life, shaft wear, and possible armature winding failures due to loosening of the armature coils. The commutator and brush life is increased since the shaft rattle causes arcing of the brushes on the commutator It has been proven experimentally that increasing the length of the chamfer increases the current necessary for the same load and tends to shift the flux back toward the leading pole tip and it is not as effective in removing the bearing rattle. In the same manner increasing the air gap around the armature has the same effect. Increasing the gap at the leading pole tip increases the current required and part of the above effect is lost. Decreasing the gap at the leading pole tip brings one back to the conventional type and bearing rattle. It was also found that in order to help the flux shift away from the leading pole tip a pole enclosure of from 70% to 75% is most effective. It has been found also that shifting the brushes back from electrical neutral does not affect the bearing rattle, but shifting the brushes in the direction of rotation improves the efficiency of the motor by compensating to some extent for the shift in the magnetic field due to chamfering the pole tips. This is just opposite to the conventional brush shift to improve commutation. To correct for the above chamber a 17° shift was found to be the most effective.

A further improvement is had by cutting away the projections around the case bolt holes which allows the insertion of a larger coil with greater ease and less damaging of the coil in inserting. The performance and capacity of the motor is increased thereby due to the larger coil.

It may be stated that of all the field pole chamfer known to the art, there are none which will accomplish the above results unless chamfered specifically as above described and that this is an entirely new and very useful improvement in the design of fields of the above type. So far as known, this is the only practical and effective means of reducing or removing bearing rattle in motors of this type.

What is claimed is:

1. In a fractional horse-power motor, a casing having end walls, self-centering bearings carried by said end walls, an armature shaft mounted in said bearings, a laminated two pole field yoke mounted in said casing and having leading and trailing pole tips, the air gap under the leading pole tips being opened to approximately from five to seven times the width of the normal air gap.

2. In a fractional horse-power direct current motor having self-centering bearings, an armature having its shaft mounted in said bearings, a bi-polar laminated field structure, the leading pole tips of said field structure being chamfered on an arc which is tangent to the field bore at from 28 to 35 percent of the pole enclosure from the leading pole tip, the air gap under the tip being from five to seven times the normal air gap.

3. An electric motor as set forth in claim 2 in which the expanded gap under the leading pole tips is defined by laying off an angle of 25° in the direction of the leading pole tip from a central diametrical line of a field lamination and on this line as a center describe an arc to the leading pole tip with a radius of approximately five-sixths the pole bore, said arc being tangent to the field bore at the point of contact of said line with said field bore.

4. In a low voltage direct current motor, a motor casing, self-centering porous sleeve bearings mounted in said casing, an armature having its shaft mounted in said bearings, a bi-polar laminated field structure supported within said casing, the leading pole tips of said field structure having an expanded arcuate air gap of approximately five to seven times the normal air gap, said arc becoming tangent to the pole bore at from 28 to 35 percent of the pole enclosure from the leading pole tip.

5. In a direct current electric machine of the type described, a laminated field core having the leading tip of each pole chamfered so as to taper off the magnetic attraction of the armature to the pole tip, an armature mounted in said core, the motor brushes being shifted from neutral in the direction of rotation and in the direction of flux shift due to the pole tip chamfer.

6. In a direct current motor of the type described, an armature, a laminated field core having the leading tip of each pole chamfered with a chamfer equal to from five to seven times the normal air gap of the motor and chamfered back on an arc tangent to the field core bore at from 28 to 35 percent of the pole enclosure from the chamfered pole tip so as to taper off the magnetic pull of the armature to the pole tip and reduce vibration of the armature shaft.

7. In a direct current bi-polar motor of the type described, a casing, self-centering porous material bearings mounted in said casing, an armature having its shaft supported in said bearings, a laminated field core having the leading tips of each pole chamfered with a chamfer equal to from five to seven times the normal air gap of the motor and chamfered back on an arc tangent to the field core bore at from 28 to 35 percent of the pole enclosure from the chamfered pole tip so as to taper off the magnetic pull of the armature to the pole tip and reduce vibration of the armature shaft.

8. In an electric machine, in combination, an armature and brushes, a field having the leading tip of each pole chamfered with a chamfer equal to from five to seven times the normal air gap of the motor and chamfered back on an arc tangent to the field bore at from 28 to 35 percent of the pole enclosure from chamfered pole tip so as to taper off the magnetic pull of the armature to the pole tip and reduce vibration of the armature shaft, said brushes being shifted from neutral approximately 17° in the direction of rotation and in direction of flux shift due to the pole tip chamfer.

9. In a direct current bi-polar motor, in combination, an armature and brushes, a laminated field core having a pole enclosure of seventy to seventy-five percent of the pole pitch, said field core having the leading tip of each pole chamfered with a chamfer equal to from five to seven times the normal air gap of the motor and chamfered back on an arc tangent to the field core bore at from 28 to 35 percent of the pole enclosure from the chamfered pole tip so as to taper off the magnetic pull of the armature to the pole tip and reduce vibration of the armature shaft.

10. In a direct current bi-polar motor, in combination, an armature and brushes, a laminated field core having a pole enclosure of seventy to seventy-five percent of the pole pitch, said field core having the leading tip of each pole chamfered with a chamfer equal to from five to seven times the normal air gap of the motor and chamfered back on an arc tangent to the field core bore at from twenty-three to twenty-eight per cent of the pole enclosure from the chamfered pole tip so as to taper off the magnetic pull of the armature to the pole tip and reduce vibration of the armature shaft, said brushes being shifted from neutral in the direction of rotation and in direction of flux shift due to the pole tip chamfer.

11. In a bi-polar direct current motor, a motor casing, self-centering bearings mounted in said casing, an armature having its shaft mounted in said bearings, a laminated continuous ring type field structure mounted in said casing, the air gap being expanded under the leading pole tips, said expanded air gap being defined by an arc tangent to the field bore at a point approximately 25° from the center of the pole face and being from five to seven times the width of the normal air gap at the leading pole tip.

12. In an electric motor, a wound armature and field with the leading pole tips chamfered so as to open the air gap under the leading pole tips to approximately from five to seven times the width of the normal air gap, and chamfered back on an arc tangent to the field bore at from 28 to 35 percent of the pole enclosure from the leading pole tips.

13. In an electric motor, a wound armature and field with the leading pole tips chamfered so as to open the air gap under the leading pole tips to approximately from five to seven times the width of the normal air gap and chamfered back on an arc tangent to the field bore at from 28 to 36 percent of the pole enclosure from the leading pole tips, in combination with a brush shift of approximately 17° in the direction of rotation of the armature.

14. In a fractional horse-power motor, a wound armature and field having the air gap under the leading pole tips opened up to approximately from five to seven times the normal air gap and chamfered back on an arc tangent to the field bore at approximately 30 percent of the pole enclosure from the leading pole tips so as to reduce the magnetic attraction of the armature to the saturated pole tips and reduce shaft vibration.

15. In a fractional horsepower, direct current motor, an armature having its shaft mounted in self-centering bearings, a bi-polar field having its leading pole tips chamfered so as to increase the air gap at the leading pole tips to from five to seven times the normal air gap so as to taper off the magnetic attraction of the armature to the saturated leading pole tips.

16. In a fractional horsepower motor, an armature having its shaft mounted in self-centering bearings, a bi-polar field having its leading pole tips chamfered so as to increase the air gap at the leading pole tips to approximately from five to seven times the normal air gap, said chamfer continuing back on an arc tangent to the field bore at approximately 30 percent of the pole enclosure from the leading pole tips.

JOSEPH S. HODDY.
GEORGE W. HODDY.